United States Patent
Murayama et al.

(10) Patent No.: US 7,984,133 B2
(45) Date of Patent: Jul. 19, 2011

(54) COMPUTER AND ACCESS CONTROL METHOD IN A COMPUTER

(75) Inventors: Koichi Murayama, Kawasaki (JP); Masahide Sato, Noda (JP); Nobuo Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 12/273,612

(22) Filed: Nov. 19, 2008

(65) Prior Publication Data

US 2009/0077250 A1  Mar. 19, 2009

Related U.S. Application Data

(63) Continuation of application No. 11/024,123, filed on Dec. 27, 2004, now Pat. No. 7,461,135.

(30) Foreign Application Priority Data

Oct. 29, 2004  (JP) .................................. 2004-315583

(51) Int. Cl.
  *G06F 15/173*  (2006.01)
(52) U.S. Cl. ........ 709/223; 709/217; 709/219; 709/224; 709/225; 709/226; 709/229; 709/232
(58) Field of Classification Search .................. 709/217, 709/219, 225, 226, 229, 232, 223, 224; 726/28
  See application file for complete search history.

(56) References Cited

U.S. PATENT DOCUMENTS

| 5,414,852 | A | 5/1995 | Kramer et al. | |
|---|---|---|---|---|
| 6,820,168 | B2 * | 11/2004 | Tanaka et al. | 711/6 |
| 2002/0111948 | A1 * | 8/2002 | Nixon et al. | 707/10 |
| 2003/0112977 | A1 * | 6/2003 | Ray et al. | 380/270 |
| 2003/0172069 | A1 | 9/2003 | Uchiyama et al. | |
| 2005/0061878 | A1 * | 3/2005 | Barenburg et al. | 235/385 |
| 2005/0071630 | A1 * | 3/2005 | Thornton et al. | 713/156 |
| 2005/0257274 | A1 * | 11/2005 | Shiga et al. | 726/28 |

FOREIGN PATENT DOCUMENTS

| JP | 06-202987 A | 7/1994 |
|---|---|---|
| JP | 2003-330622 A | 11/2003 |
| JP | 2004-046460 A | 2/2004 |
| JP | 2004-062241 A | 2/2004 |

OTHER PUBLICATIONS

Japan Patent Office (JPO) office action for JPO patent application JP2004-315583 (Jan. 26, 2010).

* cited by examiner

*Primary Examiner* — Liangche A Wang
(74) *Attorney, Agent, or Firm* — Kilpatrick Townsend & Stockton LLP

(57) ABSTRACT

A CPU 11 executes a management program B (Pb), from a management program A (Pa) receives authentication information, a request, and a program ID, and determines whether the authentication information is correct. If the authentication information is correct, the CPU 11 acquires the execution authority information of the authenticated user, compares the received information, and determines whether execution authority corresponding to the received program ID is defined. If the CPU 11 determines that execution authority corresponding to the received program ID is defined, it established the defined execution authority as the execution authority for the management program B (Pb).

7 Claims, 12 Drawing Sheets

Fig.4

Uib1

| User management table (Management Program B) | | | | |
|---|---|---|---|---|
| No. | User ID | Password | Program ID | Authority to execute |
| 1 | ID1 | Pass1 | Program A | Administrator |
| 2 | ID1 | Pass1 | None | User |

Fig.5

Uib2

| Authority to execute definition table | | | | |
|---|---|---|---|---|
| No. | Authority to execute | System setting operations | Resource operations | Resource reference |
| 1 | Administrator | OK | OK | OK |
| 2 | User | NG | NG | OK |

Fig.6

Uib3

| Operation definition table | | | | |
|---|---|---|---|---|
| No. | Operation | System settings | Resource modification | Resource reference |
| 1 | System setting operations | OK | NG | NG |
| 2 | Resource operations | NG | OK | OK |
| 3 | Resource reference | NG | NG | OK |

Fig.14

| User management table (Management Program B) | | | | |
|---|---|---|---|---|
| No. | User ID | Password | Program run route | Authority to execute |
| 1 | ID1 | Pass1 | Program C, Program A | Administrator |
| 2 | ID1 | Pass1 | Program D, Program A | User |
| 3 | ID1 | Pass1 | None | User |

Fig.15

| Authentication information management table | | | |
|---|---|---|---|
| No. | User ID | Password | Authority to execute |
| 1 | ID1 | Pass1 | Administrator |
| 2 | ID2 | Pass2 | User |
| 3 | ID3 | Pass3 | User |
| ... | ... | ... | ... |

Fig.16

| Program information management table | | | |
|---|---|---|---|
| No. | Run route | Authority to execute | Executable operation |
| 1 | Program A, Program B | Administrator | Resource modification |
| 2 | Program B | Administrator | Resource reference |
| 3 | Program A, Program B | User | Resource reference |
| ... | ... | ... | ... | ns
COMPUTER AND ACCESS CONTROL METHOD IN A COMPUTER

CROSS-REFERENCE TO RELATED APPLICATION

This application relates to and claims priority from Japanese Patent Application No. 2004-315583, filed on Oct. 29, 2004, the entire disclosure of which is incorporated by reference.

BACKGROUND

This invention relates to a computer that executes processes requested interactively by a multiplicity of programs, and to an access control method for a multiplicity of interacting programs.

A storage system (storage array device) comprises independent storage management programs, with various processes requested by users being executed on the storage device via the storage management programs. When a storage system is to be operated in an integrated fashion, an integrated management program that carries out overall management of the storage management programs on the storage device is installed. The integrated management program invokes the relevant storage management program and executes a process requested by a user via the invoked up storage management program.

In an environment in which a plurality of storage systems are integrated, a given resource of a storage system can be accessed either directly via an individual storage management program, or indirectly via an integrated management program that calls up the relevant storage management program. In this instance, if the status of a storage system resource is modified directly by an individual storage management program, a discrepancy with the resource status retained by the integrated management program may occur. Additionally, if the status of a given resource of a storage system is modified simultaneously by a multiplicity of storage management programs, discrepancies may arise among resource status retained by the different storage management programs.

This had been addressed in the past by means of operation to prevent modification of resources by storage management programs that a client (user) directly uses storage management programs, or by making private the accounts of storage management programs whose use is to be restricted, with only an integrated management program retained internally. Various other technologies for limiting user authority in consideration of interaction among programs are known as well.

SUMMARY

However, a problem with an approach involving operation to prevent modification of a resource by storage management programs that a client (user) directly uses is that as long as there is a user who does not comply with the operation, the desired effect cannot be achieved. Also, where accounts of storage management programs whose use is to be restricted are made private with only an integrated management program retained internally, it becomes necessary to create a private account for each user or each authority, creating the problem of increased management costs. Further, with technologies that limit user authority, interaction of programs is not taken into consideration, so that it is not possible to solve the aforementioned problems in environments where a plurality of storage systems are integrated.

With the foregoing in view, there is need to provide, in a computer that executes processes requested by interaction of a plurality of programs, a way to determine authority to execute for programs depending on the program usage mode.

The invention addresses the problem by providing a computer that executes processes requested by interaction of a plurality of programs. The computer pertaining to the present invention comprises a receiving module that requests a process and acquires authenticating information; an invoking program executing module that invokes a program executing module for executing a process corresponding to said acquired request, said invoking program executing module sending to the invoked program executing module identifying information for identifying said invoking program executing module and said acquired authenticating information; and an invoked program executing module that by being invoked by said invoking program executing module, or by directly receiving a request, executes the requested process, said invoked program executing module having an authenticating module that uses said authenticating information and the identifying information of said invoking program executing module to establish authority to execute for said invoked program executing module.

According to the computer pertaining to the invention, identifying information for identifying the invoking program executing module and acquired authenticating information are sent to the invoking program executing module, whereupon the authenticating information and the invoking program executing module identifying information are used to establish authority to execute for said invoked program executing module, whereby in a computer that executes processes requested interactively by a multiplicity of programs, authority to execute for programs can be determined according to program usage mode.

The computer pertaining to the present invention can also be reduced to practice as an access control method, an access control program, and a computer-readable recording medium having an access control program recorded thereon.

The following description of the computer and access control method which pertain to the invention is made on the basis of embodiments, with reference to the accompanying drawings.

BRIEF DESCRIPTION OF THE DRAWINGS

FIG. 4 is an illustration of an exemplary user management table in management program B.

FIG. 5 is an illustration of an exemplary authority to execute definition table defining executable operations by means of defined authority to execute.

FIG. 6 is an illustration of an exemplary operation definition table that defines content of executable operations by means of defined operations.

FIG. 14 is an illustration of an exemplary user management table used for establishing authority to execute in management program B when four management programs interact and execute management of the storage device 20.

FIG. 15 is an illustration of an exemplary authentication information management table for managing authentication information.

FIG. 16 is an illustration of an exemplary program information management table for administering program information.

DESCRIPTION OF THE PREFERRED EMBODIMENTS

First Embodiment

Figure 1:
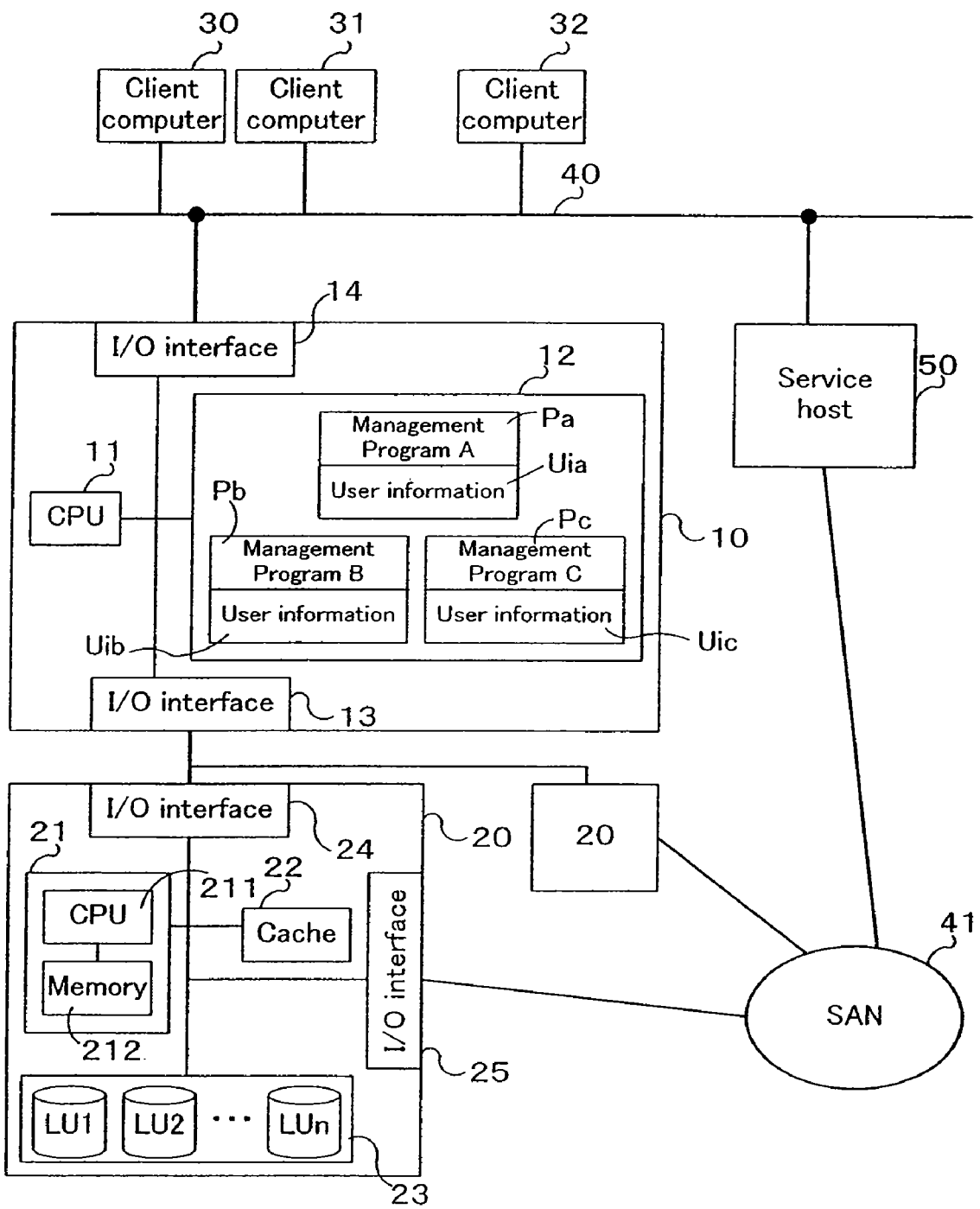
FIG. 1 is a simplified illustration of the computer system pertaining to First embodiment.
Figure 2:
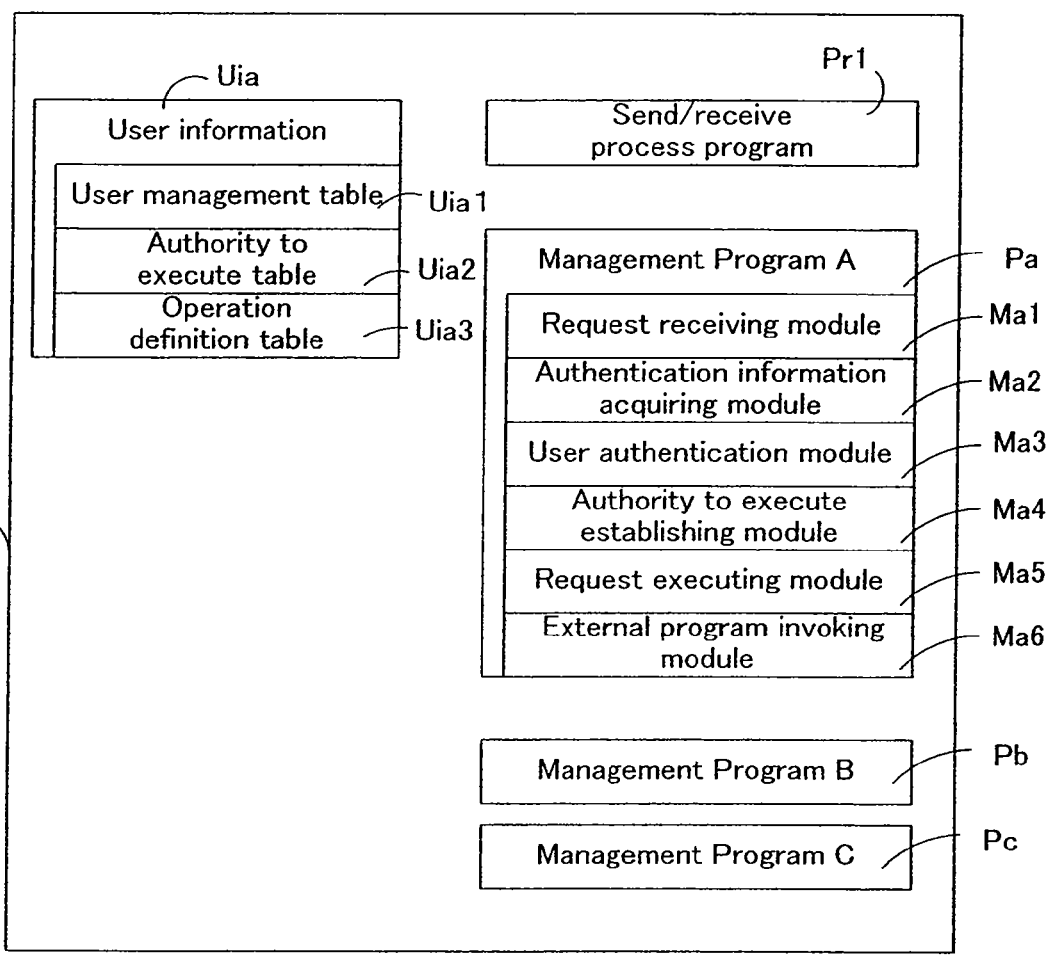
FIG. 2 is an illustration of modules stored in the memory of the computer in First embodiment.

System Configuration:

The following description of the computer system pertaining to First embodiment makes reference to FIG. 1 and FIG. 2. FIG. 1 is a simplified illustration of the computer system pertaining to First embodiment. FIG. 2 is an illustration of modules stored in the memory of the computer in First embodiment.

The computer 10 in First embodiment is an administration computer (administration server computer) that manages a storage device, for example, carrying out creation of volumes in the storage derive, assigning a host, and setting zoning and LUN masking; it is connected to one or a plurality of storage devices 20 and to a network 40. The network 40 is a local area network (LAN) with Ethernet (registered trademark) architecture, that carries out transmission of data using the TCP/IP communications protocol. Client computers 30, 31, 32 are connected to the network 40; the client computers 30 to 32 execute management of the storage device 20 via the administration computer 10.

A service host computer 50 is connected to the network 40, and the service host computer 50 is connected to the storage device 20 via a SAN (Storage Area Network) 41. The service host computer 50 executes a database management system (DBMS) or other service program in response to requests from the client computers 30 to 32, and writes process results to the storage device 20, or utilizes an information resource stored in the storage device 20. A Fibre Channel or iSCSI communications protocol is used in the SAN.

The computer 10 comprises a CPU 11, a memory 12, a rear end I/O interface 13, and a front end I/O interface 14. The CPU 11, the memory 12, the rear end I/O interface 13, and the front end I/O interface 14 are interconnected via a bus. The CPU 11 is a processing unit that executes various programs and modules stored in the memory 12. The memory 12 is a so-called internal storage device, and includes both nonvolatile memory storing the various modules etc., and volatile memory for temporary storage of operation results. The rear end I/O interface 13 is connected to the storage device 20 via a local area network (LAN). The front end I/O interface 14 is connected to the network 40, and executes sending and receiving of commands and data among the client computers 30 to 32 using the TCP/IP protocol.

The storage device 20 comprises a disk array controller 21, a cache 22, a plurality of disk devices 23, and an I/O interface 24. The disk array controller 21 is a control circuit that executes control processes of various kinds on the storage device 20, and comprises a CPU 211, memory 212, and an I/O port. The cache 22 is a kind of memory device for temporary storage of data that is to be written to a disk device 23, or of data being read from a disk device 23.

The disk devices 23 are provided as a disk array device of RAID configuration composed of a plurality of magnetic hard disk drives, the plurality of magnetic hard disk drives constituting one or several logical units (LU), or as a single hard disk drive have one or several memory areas, i.e. logical units (LU). Access to each logical unit is carried out using a logical unit number (LUN) and a logical block address (LBA). The I/O interface 24 is connected to the rear I/O interface 13 of the administration computer 10 via a signal line.

The client computers 30 to 32 are, for example, terminal devices for input or output of data of various kinds, and via the service host computer 50 execute, for example, database management processes, and execute writing of processed data to the storage device 20 and reading of data from the storage device 20. The client computers 30 to 32 also carry out management of the storage device 20 via the administration computer 10. The client computers 30 to 32 may instead be a single computer, or four or more.

The following description of the various programs and modules stored in the memory 12 makes reference to FIG. 1 and FIG. 2. The memory 12 has stored therein a send/receive process program Pr1 for exchange of data and requests with the client computers, a management program A (Pa), a management program B (Pb), a management program C, and user information utilized by each of the management programs, stored in association with the respective management programs. By way of example, FIG. 2 shows the management program A (Pa) and the details of the user information Uia utilized by the management program A (Pa).

The management program A (Pa) is an integrated storage management program that handles in an integrated manner the management program B (Pb) and C (Pc) provided to each of the storage devices 20, and corresponds to the invoking (first) program. With the management program A (Pa), there are carried out processes that span several storage devices, and that cannot be managed by the individual management programs B (Pb) and C (Pc) provided to each of the storage devices 20. For example, the management program A (Pa) provides a storage pool function whereby a number of storage devices are managed as a single virtual storage device, backup schedule management of the logical volumes (logical units) of a storage device, and restriction management of access to the logical volumes.

The management program A (Pa) comprises a request receiving module Ma1 that receives requests and authentication information from the client computer 30; an authentication information acquiring module Ma2 that acquires the received authentication information; a user authentication module Ma3 that carries out user authentication using authentication information; an execution authority establishing module Ma4 that uses a program ID to establish authority to execute for an invoked program; a request executing module Ma5 that executes requests input from the client computer 30; and an external program invoking module Ma6 that executes identification of an invoked program and invocation of the invoked program.

The user information Uia comprises a user management table Uia1, an execution authority definition table Uia2, and an operation definition table Uia3, described later.

The management programs B (Pb) and C (Pc) likewise comprise similar modules. The management programs B (Pb) and C (Pc) are assigned on a one-to-one basis to any single storage device, and execute various management processes in the corresponding storage device. The management programs B (Pb) and C (Pc) provided to the individual storage devices correspond to invoked (second) programs. The CPU 11 corresponds to the invoked program executing module and the invoking program executing module. Alternatively, by viewing the management programs A (Pa), B (Pb) and C (Pc) executed by the CPU 11 as management program executing modules A (Pa), B (Pb) and C (Pc), the management program A executing module Pa can be considered as the invoking program executing module, and the management program B, C executing modules Pb, Pc as invoked program executing modules.

Typically, since the management programs B (Pb) and C into the administration computer 10 are sequentially introduced each time that an additional storage device 20 is provided, the individual storage devices 20 a managed by the individual management programs, and thus it is not possible to manage a plurality of storage devices 20 in a consolidated (integrated) manner. Under such conditions, by introducing the Integrated management program A (Pa) into the administration computer 10, consolidated management of the storage devices is possible through the Integrated management program A (Pa).

Figure 3:
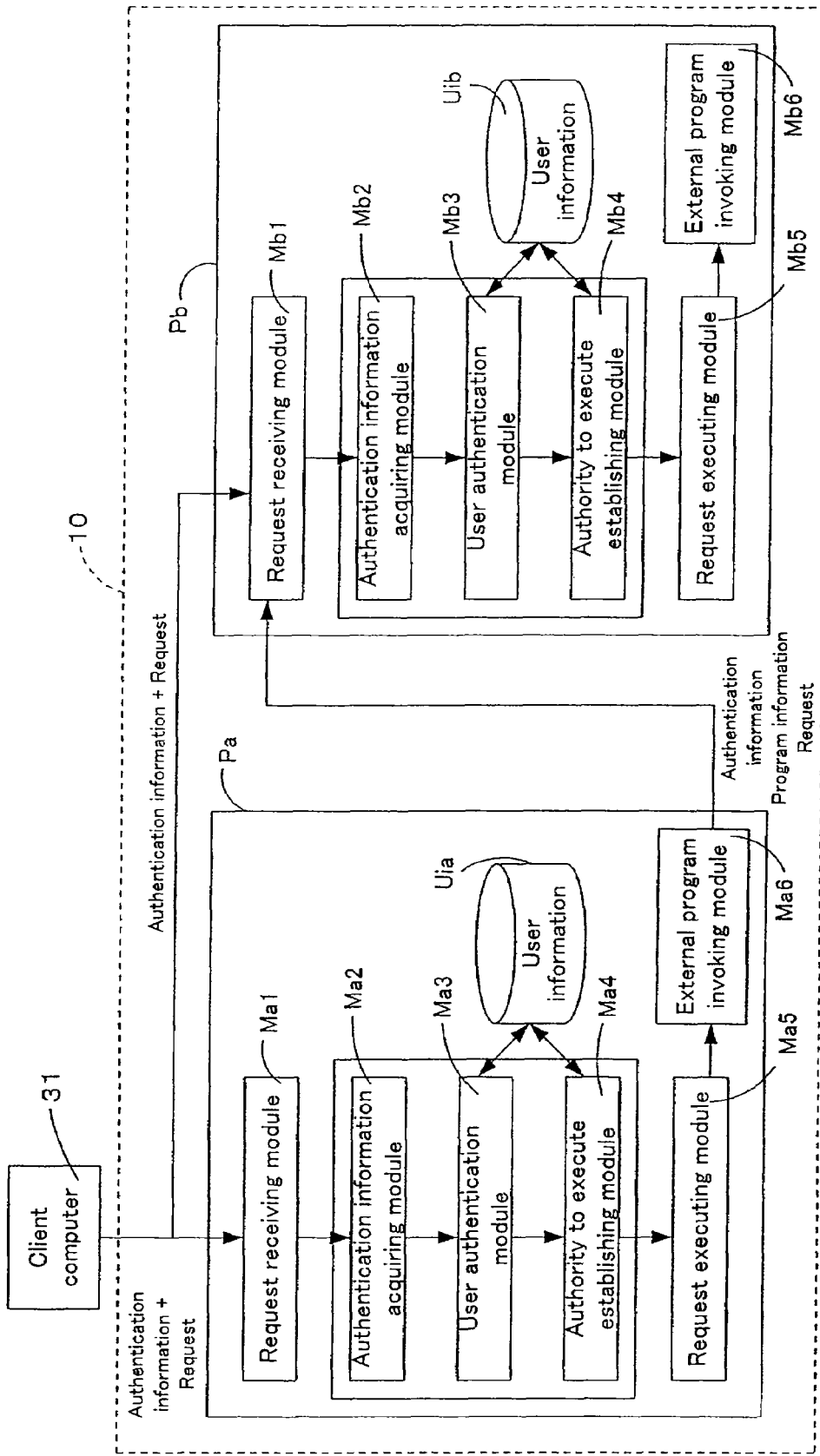
FIG. 3 is an illustration of functional blocks realized by the administration computer pertaining to First embodiment.
Figure 7:
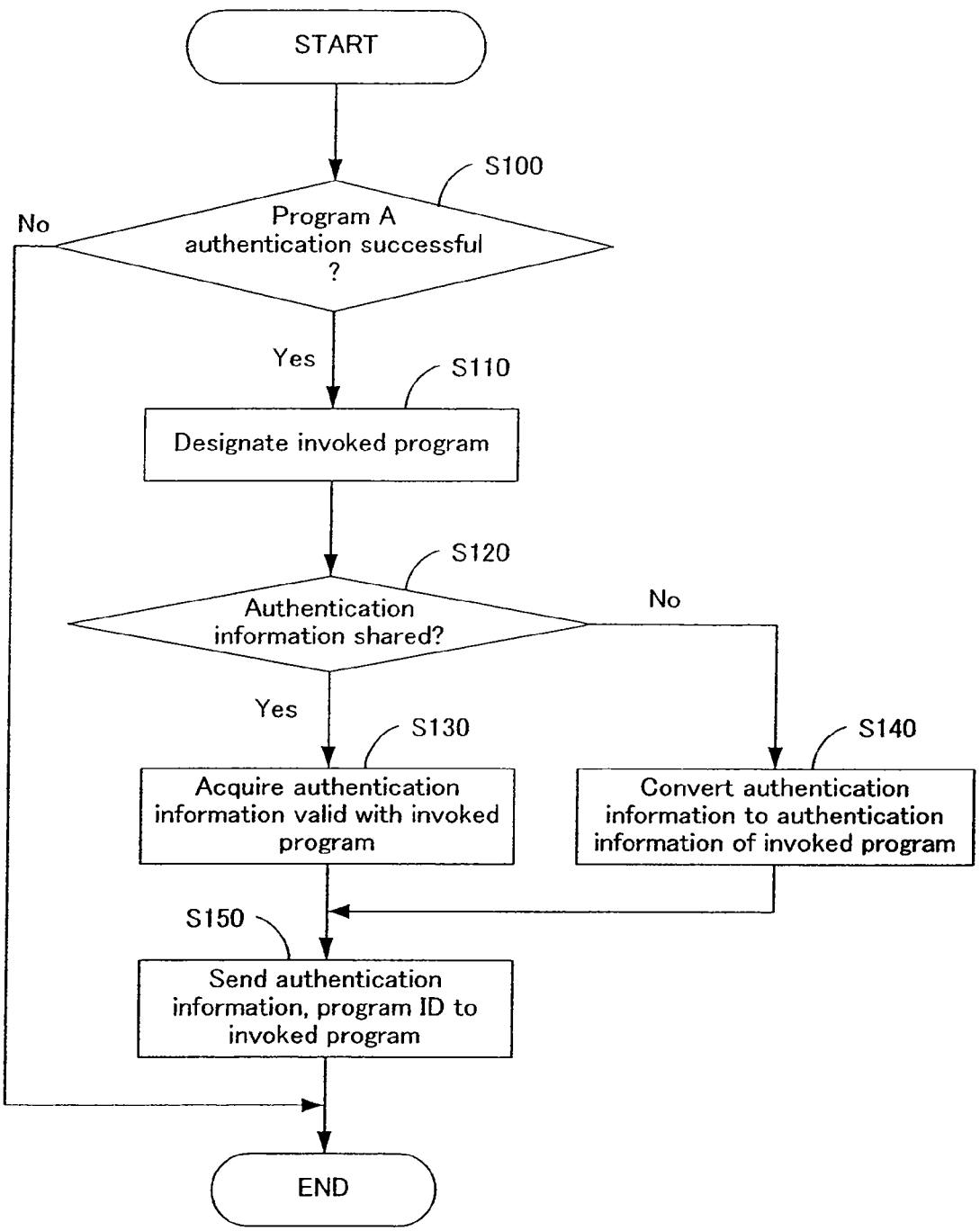
FIG. 7 is a flowchart showing the processing routine executed by management program A (invoking program).
Figure 8:
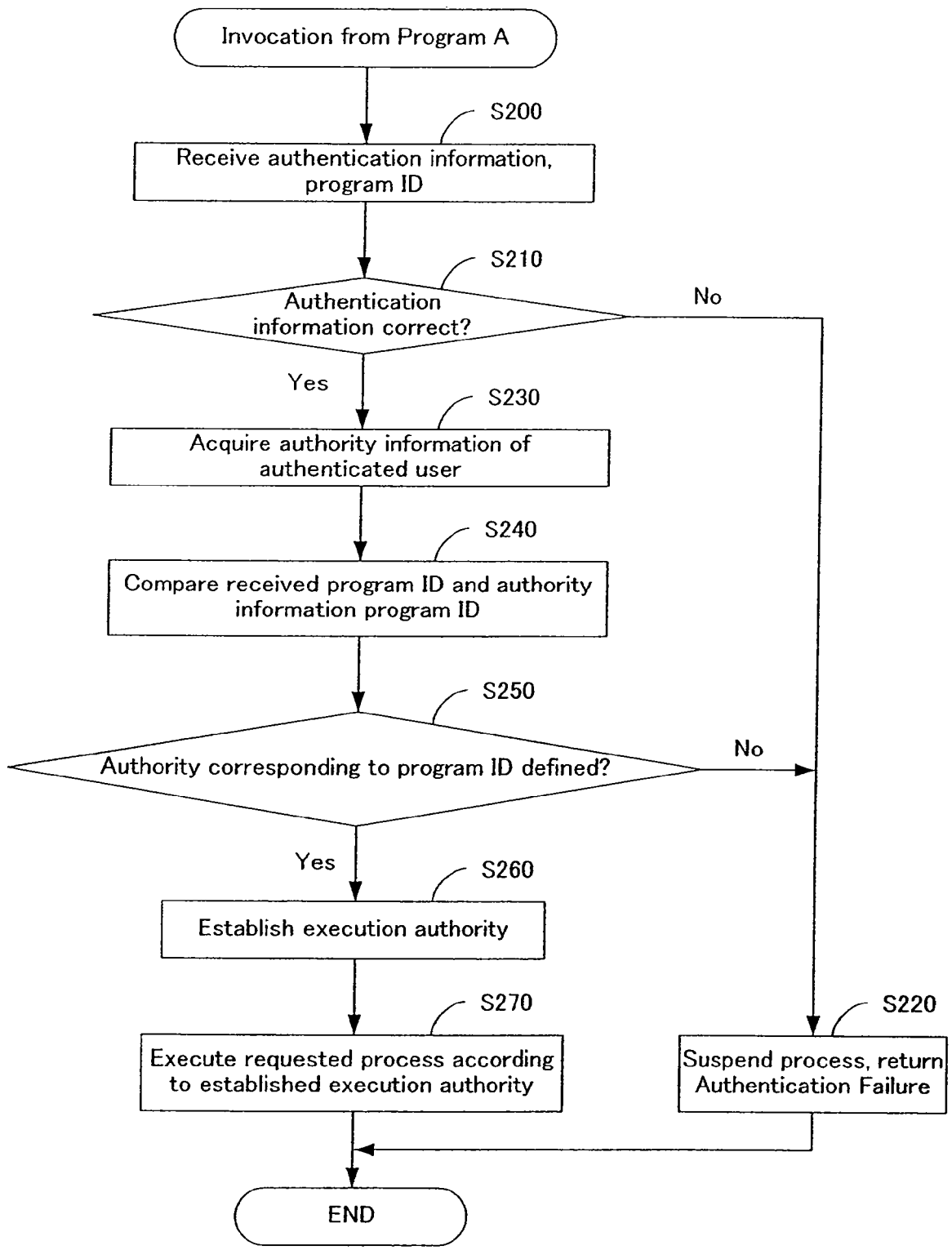
FIG. 8 is a flowchart showing the processing routine executed by management program B (invoked program).

The following description of the access control process executed during program interactive process in the administration computer 10 makes reference to FIG. 3 to FIG. 8. FIG. 3 is an illustration of functional blocks realized by the administration computer pertaining to First embodiment. FIG. 4 is an illustration of an exemplary user management table in the management program B (Pb). FIG. 5 is an illustration of an exemplary authority to execute definition table defining executable operations by means of defined authority to execute. FIG. 6 is an illustration of an exemplary operation definition table that defines content of executable operations by means of defined operations. FIG. 7 is a flowchart showing the processing routine executed by the management program A (Pa) (invoking program). FIG. 8 is a flowchart showing the processing routine executed by the management program B (Pb) (invoked program). The programs and modules are executed by the CPU 11.

The processing routine shown in FIG. 7 is initiated, for example, by running the management program A (Pa) from the client computer 30. The CPU 11 executes the request receiving module Ma1, and receives the authentication information and process request input from the client computer 30. Authentication information consists of account information necessary for authentication, for example, a user name and password; the process request is, for example, a request to create a new logical volume in the storage device 20.

The CPU 11 then executes the authentication information acquiring module Ma2 and acquires the received authentication information. The CPU 11 executes the authentication module Ma3 and executes authentication for the management program A (Pa) (Step S100). Specifically, the CPU 11 searches the user information and determines whether authentication information exists for the management program A (Pa) in question. In the event that authentication information can be verified to exist, i.e. authentication is successful (Step S100: Yes), the CPU 11 runs the execution authority establishing module Ma4. If on the other hand authentication information cannot be verified to exist, i.e. authentication is not successful (Step S100: No), the client computer 30 is informed to the effect that authentication failed, and the processing routine terminates.

The CPU 11 executes the execution authority establishing module Ma4, and on the basis of the user management table establishes in the management program A (Pa) authority to execute assigned to the user. For example, the authority to invoke the management program B (Pb) via the management program A (Pa), the authority to modify settings in the management program A (Pa), or authority settings denying either or both of these are established.

The CPU 11 executes the request executing module Ma5, and depending on the established authority to execute, executes the request input from the client computer 30. In the event that the request input from the client computer 30 invokes the management program B (Pb), and authority to invoke the management program B (Pb) via the management program A (Pa) is verified, the CPU 11 executes the external program invoking module Ma6.

The CPU 11 identifies the invoked program that is to be invoked by the request from the client computer 30 (Step S110). Specifically, in association with the request input from the client computer 30, there is identified the storage device 20 constituting the target to which access is being requested and which is targeted for execution of the process requested by the LUN, and thus the management program managing the identified storage device 20, namely, the management program B (Pb) in this embodiment, can be identified. The CPU 11 also determines whether the authentication information input from the client computer 30 is used in common by the invoking management program and the invoked management program (Step S120). For example, it can be determined whether the invoked management program is integrated with the invoking management program.

When the management program A (Pa) and management program B (Pb) are integrated, a single set of authentication information is shared in common by the management program A (Pa) and management program B (Pb). On the other hand, when the management program A (Pa) and management program B (Pb) are not integrated, individual identifying information will be required for each, and it will therefore be necessary to convert to authentication information corresponding to the management program B (Pb). Conversion is carried out, for example, using a table that associates authentication information in the management program A (Pa) with authentication information in the management program B (Pb) for a given user, as the user information of the management program A (Pa).

If authentication information is shared in common (Step S120: Yes), the CPU 11 acquires the authentication information input from the client computer 30 (Step S130), as authentication information that is valid in the invoked program.

If authentication information is shared in common (Step S120: No), the CPU 11 converts the authentication information input from the client computer 30 into authentication information that is valid in the invoked program (Step S140).

The CPU 11 invokes the management program B (Pb), and sends the acquired or converted authentication information and the request, and identifying information for identifying the management program A (Pa) (program ID) to the management program B (Pb) (Step S150), and then terminates the routine. As the program ID, there is used at least one item of information such as program name, program product ID, folder configuration (e.g. a file indicating the version), registry key.

Through invocation from the management program A (Pa), the management program B (Pb) initiates the processing routine shown in FIG. 8. The CPU 11 executes the request receiving module Mb1, and receives the authentication information and process request, and the program ID, sent from the management program A (Pa) (Step S200). The CPU 11 executes the authentication information acquiring module Mb2, acquires the received authentication information, executes the user authentication module Mb3, and determines whether the authentication information is correct (Step S210). Specifically, the CPU 11 searches the user information and searches for whether the corresponding authentication information exists.

The user management table shown in FIG. 4 may be employed as user information, for example. That is, the user information includes a user ID for identifying the user, and a password for determining (verifying) whether the user ID has been input by the proper user. If the CPU 11 determines that the authentication information is not correct, i.e. that there is no corresponding authentication information (Step S210: No), the CPU 11 suspends the process, returns an Authentication Failed status to the client computer 30 (Step S220), and terminates the processing routine.

If the CPU 11 determines that the authentication information is correct, i.e. that corresponding authentication information exists (Step S210: Yes), CPU 11 runs the execution authority establishing module Mb4. The CPU 11 acquires authority to execute information (the user management table) for the authenticated user (Step S230), compares the received program ID with the program ID included in the acquired authority to execute information (Step S240), and determines whether authority to execute corresponding to the received program ID are defined (Step S250). As noted, as the program ID, for example, there is used program name, program product ID, folder configuration (e.g. a file indicating the version), registry key, and thus information enabling the program IDs to be compared and authenticated is stored by way of user information of the management program B (Pb).

Specifically, using the user management table shown in FIG. 4, it is determined whether a program ID corresponding to the received program ID exists in the user management table. As the method for making the determination, it is acceptable to always assign some authority to execute to program IDs described in the user management table, and to determine whether a program ID corresponding to the received program ID exists in the user management table. Alternatively, it would be acceptable to describe all related program IDs in the user management table and to assign detailed authority to execute to each program ID, and make the determination on the basis of the authority to execute assigned to a particular program ID.

If the CPU 11 determines that authority to execute have been defined for the received program ID (Step S250: Yes), the defined authority to execute are established as authority to execute for the management program B (Pb) (Step S260). On the other hand, if the CPU 11 determines that authority to execute have not been defined for the received program ID (Step S250: No), the CPU 11 suspends the process, returns an Authentication Failed status to the client computer 30 (Step S220), and terminates the processing routine.

In the example of FIG. 4, in the event that Program A (Pa) is input as the program ID, "Administrator" authority to execute are established, whereas in the event that no program ID is input, i.e. where the management program B (Pb) has been run directly by the client computer 30, "User" authority to execute are established. Generally, "Administrator" authority to execute are those intended to be assigned to the administrator, and that grant all authority to execute with respect to the management programs. On the other hand, "User" authority to execute are those intended to be assigned to ordinary users, and that grant only certain authority to execute with respect to the management programs.

As shown in FIG. 5, in the embodiment, the "Administrator" is granted all system operation settings, resource operations, and resource reference operations, whereas a "User" on the other hand is granted only resource reference operations. As shown in FIG. 6, system operation settings permit carrying out of system settings, which are settings for operating programs, including host name, host number, and other server settings; resource operations include both resource modifications, i.e. creating, modifying, and deleting logical units, as well as resource reference, whereas resource reference operations permit only resource reference.

The CPU 11 executes the request executing module Mb5, and depending on the established authority to execute, executes the request input from the client computer 30 (Step S270), and terminates the processing routine. In the event that an additional management program C is invoked via the management program B (Pb), an external program invoking module Mb6 may be provided for the purpose of invoking the management program C.

Figure 9:
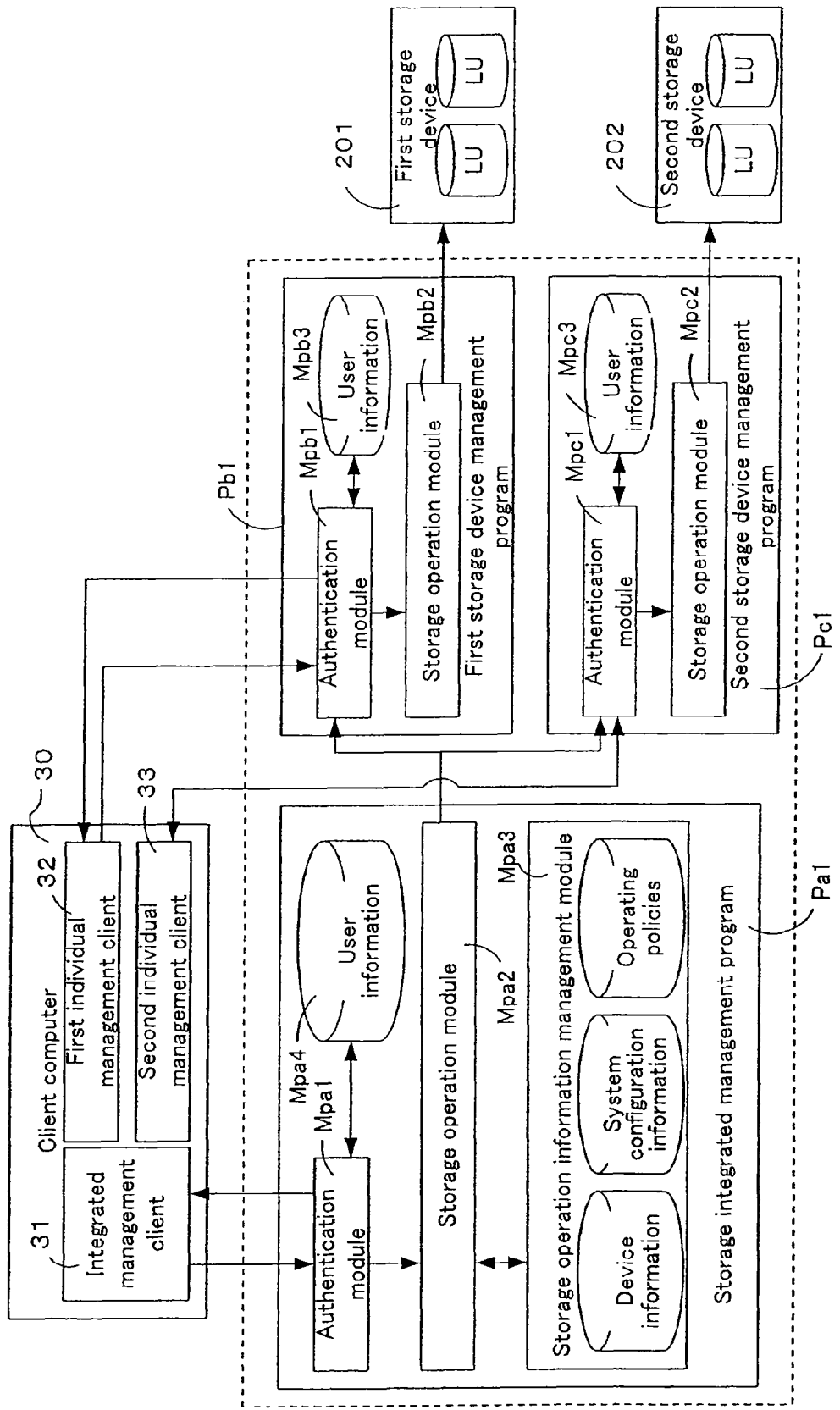
FIG. 9 is a simplified illustration of a computer system.
Figure 10:
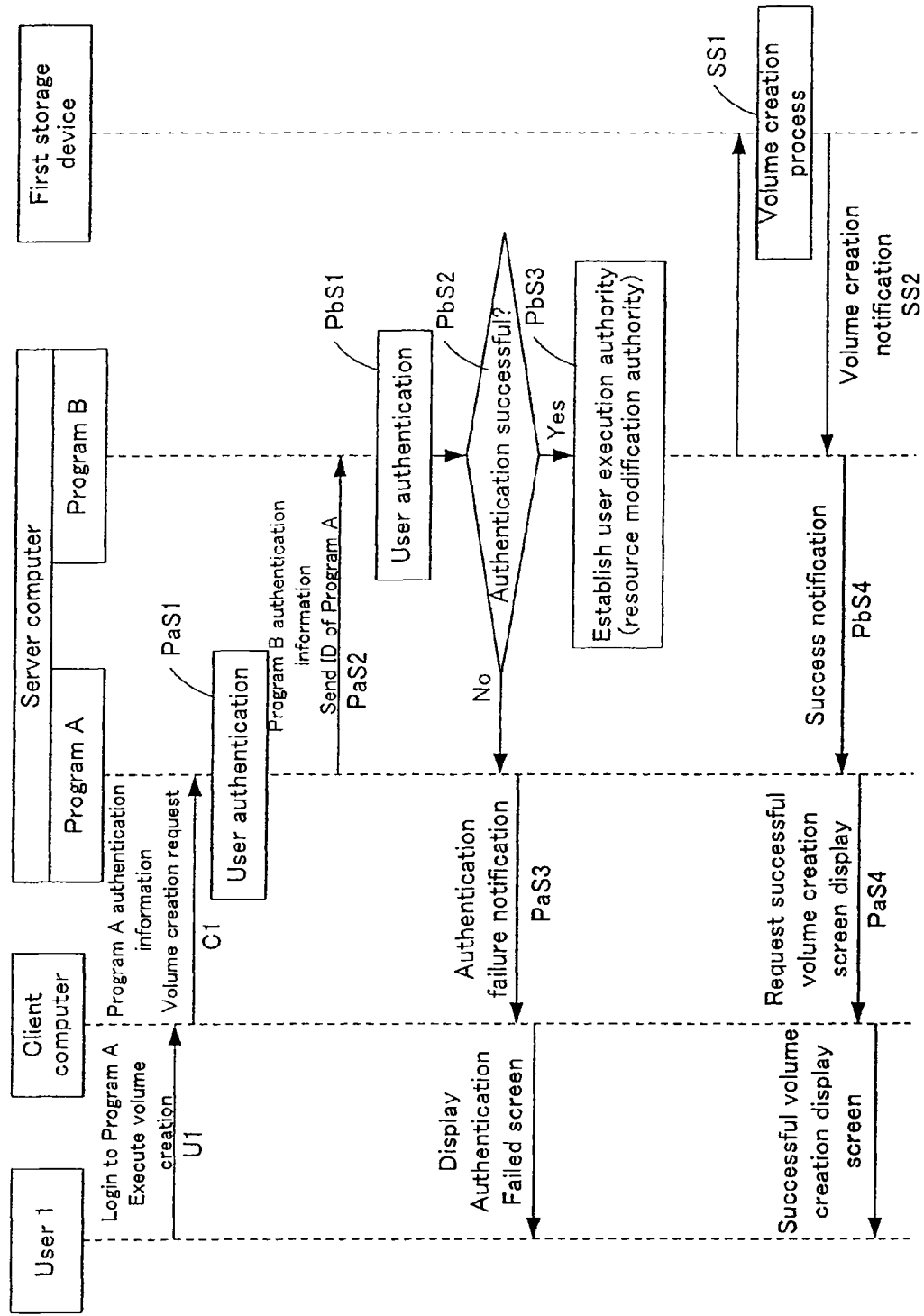
FIG. 10 is a flowchart showing the processing routine executed in the event that management program B is executed from a client computer via management program A.
Figure 11:
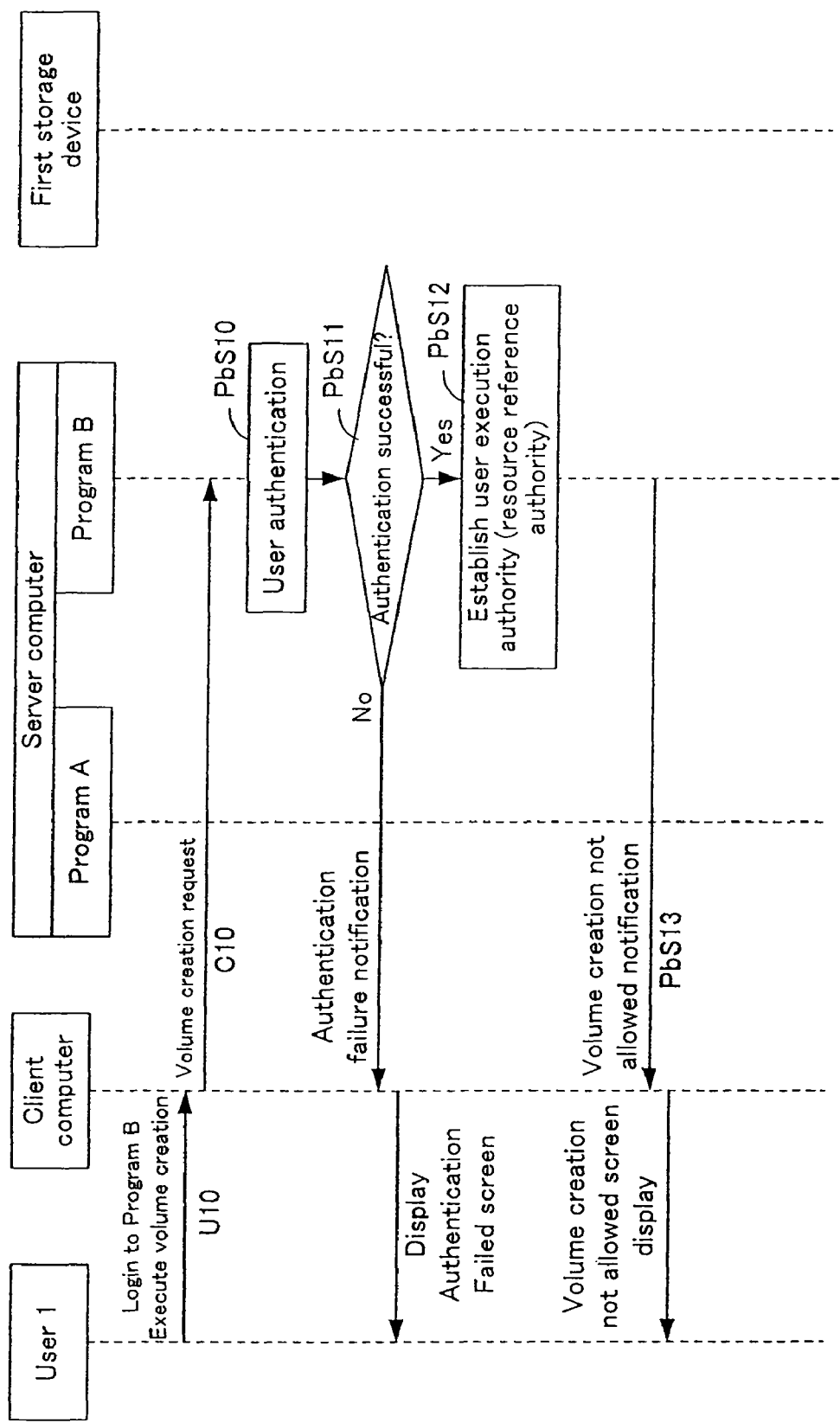
FIG. 11 is a flowchart showing the processing routine executed in the event that management program B is executed directly from a client computer.

The following detailed description of the access control process during the program interaction process in First embodiment makes reference to FIG. 9 to FIG. 11. FIG. 9 is a simplified illustration of the computer system. FIG. 10 is a flowchart showing the processing routine executed in the event that the management program B (Pb) is executed from a client computer via the management program A (Pa). FIG. 11 is a flowchart showing the processing routine executed in the event that the management program B (Pb) is executed directly from a client computer.

To briefly describe the arrangement of the computer system, the computer system comprises a client computer 30, an administration computer 10, and first and second storage devices 201, 202. On the client computer 30 are stored an integrated management client program 31 that executes a storage integrated operation management program Pa (invoking program) stored on computer 10; and first and second individual management client programs 32, 33 for executing first and second storage device management programs Pb, Pc (invoked programs). The CPU provided in the client computer 30 functions as the client program executing module that executes these client programs.

On computer 10 are stored first and second storage device management programs Pb1, Pc1 for executing management of the first and second storage devices 201, 202; and a storage integrated operation management program Pa1 for integrated management of the first and second storage device management programs Pb, Pc. The storage integrated operation management program Pa1 comprises an authentication module Mpa1 that carries out user authentication, a storage operation module Mpa2 that carries out operations on the storage devices, a storage operation information managing module Mpa3 that manages information for storage operation, and a user information storage module Mpa4 that stores user information including authentication information needed for authentication. In the storage operation information management module Mpa3 are stored device information relating to resource status/operating status of the first and second storage devices 201, 202; system configuration information for the host and service server; and operation policies including backup schedule, countermeasures in the event a malfunction occurs, and security policy.

The first and second storage device management programs Pb1, Pc1 each comprise an authentication module Mpb1, Mpc1 that carries out user authentication; a storage operation module Mpb2, Mpb3 that carries out operations on the storage device 201, 202; and a user information storage module Mpb3, Mpc3 that stores user information including authentication information needed for authentication.

The first and second storage devices 201, 202 are each configured as a RAID composed of several disk devices, and have one or several logical units (LU).

The following description of execution of the management program B (Pb) from the client computer via the management program A (the storage integrated operation management program Pa1) makes reference to FIG. 10.

The user 1 inputs to the client computer 30 authentication information for logging in to the management program A (Pa1), and a new volume creation request to the first storage device 201 (Step U1). The integrated management client program 31 of the client computer 30 sends the input authentication information and volume creation request to the management program A (Pa1) (Step C1). The administration computer 10 (CPU) executes the management program A (Pa1), and performs user authentication by means of the authentication module Mpa1 (Step PaS1). In the event that user authentication is successful, the administration computer 10, by means of the storage operation information management module Mpa3, runs the management program that manages the target storage device, for example, the management program B (Pb1), and sends to the management program B (Pb1) authentication information for the management program B (Pb1) and identifying information (program ID) for the management program A (Pa1) (Step PaS2). In the event that user authentication fails, the administration computer 10 notifies the client computer 30 of authentication failure, so that the user 1 can be notified of the authentication failure to the management program A (Pa1), for example, by means of the display screen of the administration computer 10.

The administration computer 10 executes the management program B (Pb1), and using the authentication information for the management program B (Pb1) and the ID of the management program A (Pa1), performs user authentication by means of the authentication module Mpb1 (Step PbS1); in the event that authentication fails (Step PbS2: No), it notifies the management program A (Pa1) of the authentication failure. Upon receiving notification of authentication failure, the management program A (Pa1) sends an Authentication Failed notification to the client computer 30 (Step PaS3). The user 1 can be notified of the authentication failure to the management program B (Pb1), for example, by means of the display screen of the client computer 30.

In the event that authentication to the management program B (Pb1) is successful (Step PbS2: Yes), the administration computer 10 establishes the user authority to execute assigned to the user 1 as authority to execute having a "resource modification authority" (Step PbS3). The administration computer 10 executes the storage operation module Mpb2 and requests the first storage device 201 to create the volume. Upon receiving the volume creation request, the first storage device 201 creates the requested volume, for example, via a disk adapter (Step SS1). When the volume creation process is complete, the first storage device 201 sends Volume Created notification to the management program B (Pb1) (Step SS2).

The management program B (Pb1) notifies the management program A (Pa1) to the effect that the volume has been successfully created (Step PbS4). The management program A (Pa1) stores information for the newly created volume as device information in the storage operation information management module Mpa3, and requests the client computer 30 to display a successful volume creation display screen (Step PaS4). By confirming the successful volume creation display displayed on the display screen of the client computer 30, the user 1 can be notified of successful creation of a new volume in the first storage device 201.

The following description of direct execution of the first storage device the management program Pb (the management program B) by a client computer makes reference to FIG. 11.

The user 1 inputs to the client computer 30 authentication information for logging in to the management program B (Pb1), and a new volume creation request to the first storage device 201 (Step U10). The first individual management client program 32 of the client computer 30 sends the input authentication information and volume creation request to the management program B (Pb1) (Step C10). The administration computer 10 executes the management program B (Pb1), and performs user authentication by means of the authentication module Mpb1 (Step PbS10) using the authentication information of the management program B (Pb1). In the event that user authentication fails (Step PbS11: No), the client computer 30 is notified of the authentication failure. The client computer 30 displays the authentication failure on the display screen, so that the user 1 can be notified of the authentication failure with respect to the management program B (Pb1), through the display screen of the client computer 30.

In the event that authentication with respect to the management program B (Pb1) is successful (Step PbS11: Yes), the administration computer 10 establishes the user authority to execute assigned to the user 1 as authority to execute having a "resource reference authority" (Step PbS12). Specifically, since there is no program ID (identifying information) of the management program A (Pa1), a high authority level enabling modification of resource status is not established. Since the user 1 is only granted resource reference authority, the administration computer 10 notifies the client computer 30 that the user 1 does not have volume creation authority (Step PaS13). Through the display screen of the client computer 30, the user 1 can be notified that volume creation is not allowed.

As described hereinabove, according to the administration computer 10 of First embodiment, in cases where a multiplicity of the management programs interact, the desired access control can be carried out depending on the mode of program interaction (the program startup mode, invoking mode). More specifically, in cases where a storage device is managed by means of an invoking program (storage integrated operation management program Pa, Pa1) invoking an invoked program (storage device management program Pb, Pb1, Pc1), high authority to execute can be assigned to the user, whereas in cases where management of a storage device is executed directly by means of an invoked program, low authority to execute can be assigned to the user. That is, authority to execute can be established in such a way that where an invoked program is executed through an invoking program, resource modification to the storage device 20 and modification of system settings can be permitted, while in the case of direct execution by an invoked program, only reference to resources of the storage device 20 is permitted.

As a result, it is possible to avoid a situation in which, for example, in the event the storage device management program Pb has been run directly, and a resource of the storage device 20 has been modified, the storage integrated operation management program Pa fails to be notified of the resource modification, so that execution of the storage integrated operation management program Pa is impaired. Specifically, in the event that the storage device management program Pb has been run directly, and a volume targeted in the backup schedule by the storage integrated operation management program Pa has been deleted, if the storage integrated operation management program Pa is not notified of the fact that the volume targeted in the backup schedule has been deleted, an error will occur when the backup process is executed. Or, where the storage device management program Pb has been run directly, and the access address for a volume has been changed, the problem of inability of the storage integrated operation management program Pa to access the desired address will occur.

With the administration computer 10 of First embodiment, on the other hand, in the event that the storage device management program Pb has been run via the storage integrated operation management program Pa, resource modifications to the storage device 20 will be permitted, but in the event that the storage device management program Pb has been run directly, resource modifications to the storage device 20 will not be permitted, thereby reducing or avoiding the occurrence of the problem mentioned above.

In the authentication process carried out in an invoked program, identifying information of the invoking program is utilized, so that it is possible to quickly and accurately determine whether an invoked program has been executed through the agency of the invoking program, or whether an invoked program has been executed directly. Additionally, establishment of authority to execute over a wide range depending on the invoking program is possible as well.

Authority to execute may be granted as in the following examples as well.

(a) When authority to execute of an invoked program is the same as compared to the case where there is no program ID.

In cases where there is no effect on the invoking program even if an invoked program is executed directly (in the case that there is no effect on the processes of the invoking program), the access restrictions of the invoked program may be the same, regardless of the route by which the invoked program is invoked.

(b) When low authority to execute is established for an invoked program as compared to the case where there is no program ID.

In the case of an unregistered program or a program ID that is no longer supported, running from the program will not be permitted even if the program ID is successfully acquired.

(c) When unique restrictions are imparted during program interaction.

Where the invoking program is a monitoring program, in the event of running from the invoking program, reference authority will not be granted without exception.

Second Embodiment

Figure 12:
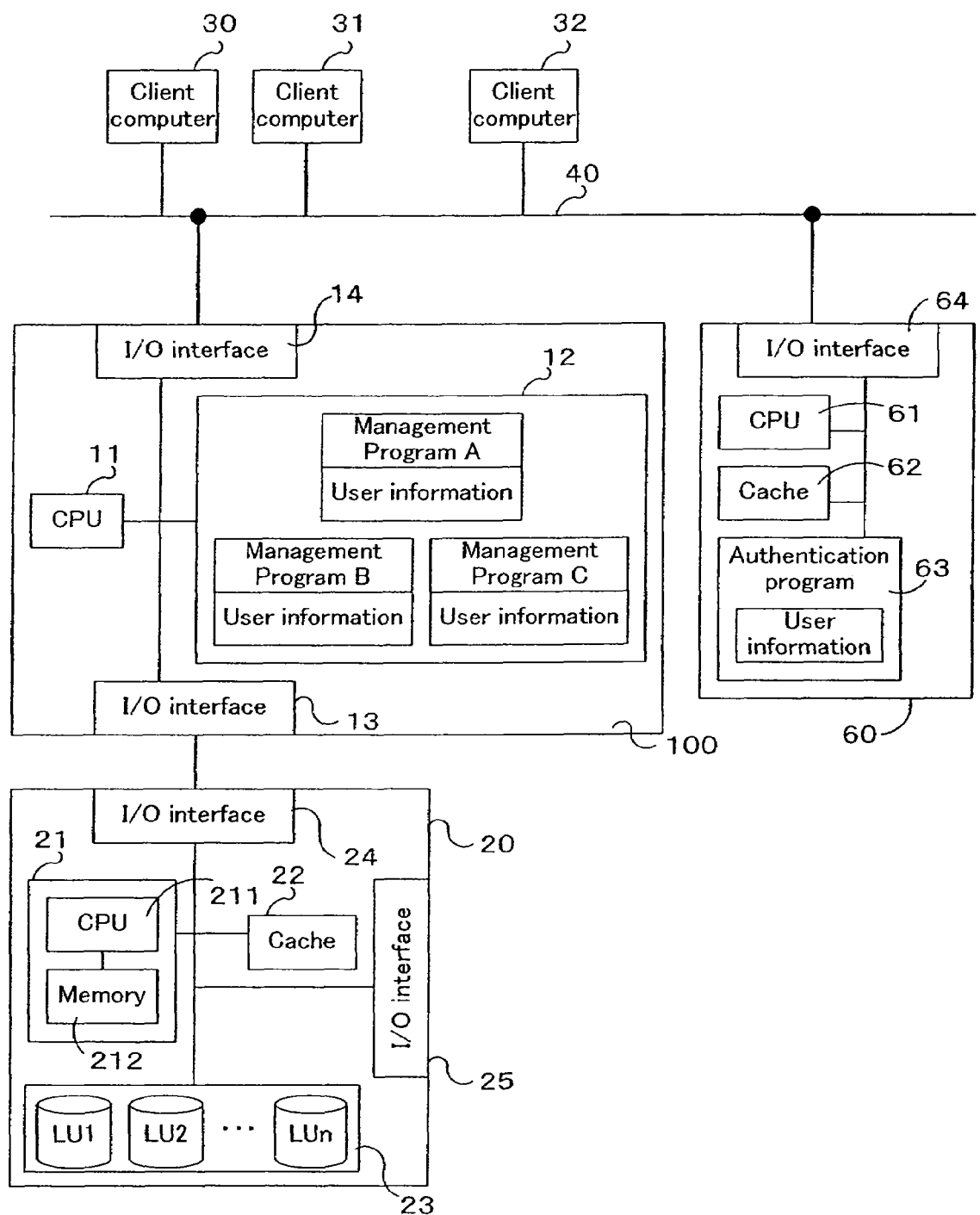
FIG. 12 is a simplified illustration of the computer system pertaining to Second embodiment.
Figure 13:
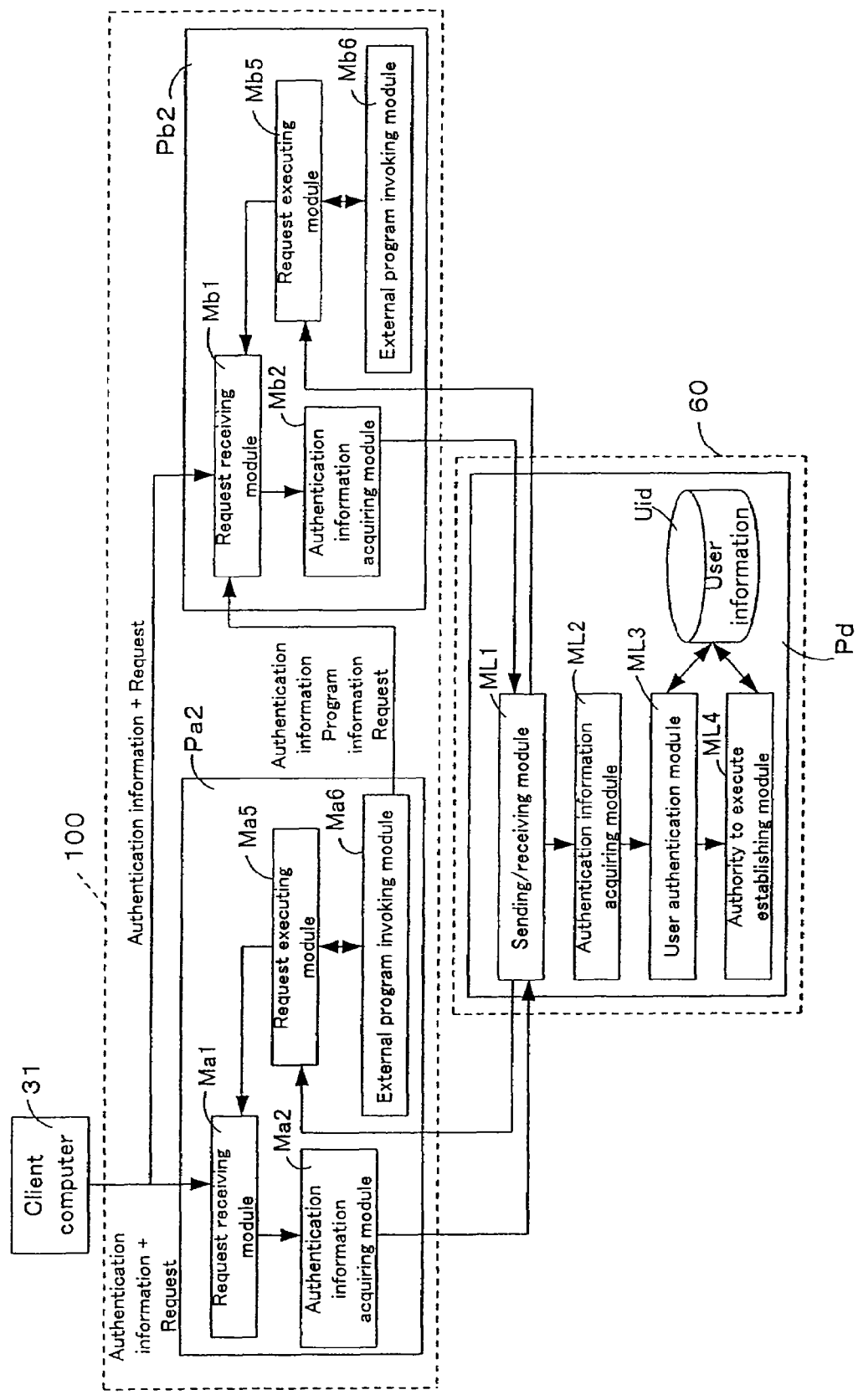
FIG. 13 is an illustration of functional blocks realized by the administration computer pertaining to Second embodiment.

The following description of the computer system pertaining to Second embodiment makes reference to FIG. 12 and FIG. 13. FIG. 12 is a simplified illustration of the computer system pertaining to Second embodiment. FIG. 13 is an illustration of functional blocks realized by the administration computer pertaining to Second embodiment. The administration computer 100 pertaining to Second embodiment has a basic arrangement similar to the administration computer 10 pertaining to First embodiment, with the exception of a different arrangement of the modules stored in the management programs; since the arrangement of the storage device in Second embodiment is similar to the arrangement of the storage device 20 in First embodiment, symbols identical to the symbols used in First embodiment are used, and detailed description of arrangements is not provided.

In the computer system pertaining to Second embodiment, apart from the administration computer 100, there is additionally provided an authentication computer 60, with authentication processes for the management programs Pa2, Pb2 being executed in the authentication computer 60. The authentication computer 60 comprises a CPU 61 for executing authentication processes; a cache 62 for temporary storage of authentication information used for authentication, or authentication results; memory 63 for storing an authentication program Pd and user information Uid; and an I/O interface 64 that executes communication with the administration computer 100 and the client computers 30, 31, 32 via the local area network 40.

In this embodiment, since a separate authentication computer 60 is provided in addition to the administration computer 100, as shown in FIG. 13, the management program A (Pa2) and management program B (Pb2) are not provided with the modules needed for user authentication. Instead, the authentication program Pd of the authentication computer 60 comprises a sending/receiving module ML1 that sends and receives authentication information and authentication results to and from the management programs in the administration computer 100, an authentication information acquiring module ML2 that acquires authentication information from received authentication information, a user authentication module ML3 that executes user authentication, an execution authority establishing module ML4 that establishes authority to execute depending on the order of program execution, and user information Uid.

Following is a description of the access control process during program interaction in the computer system pertaining to Second embodiment.

When, for example, the management program A (Pa2) is run from the client computer 30, the CPU 11 executes the request receiving module Ma1, and receives the authentication information and process request input from the client computer 30. Authentication information consists of account information necessary for authentication, for example, a user name and password; the process request is, for example, a request to create a new logical volume in the storage device 20. The CPU 11 executes the authentication information acquiring module Ma2, acquires the received authentication information, and sends to the authentication computer 60 authentication information for the acquired the management program A (Pa2).

In the authentication computer 60, the CPU 61 executes the sending/receiving module ML1, and receives identifying information sent from the management program A (Pa2). The CPU 61 executes the authentication information acquiring module ML2 and acquires the received authentication information. The CPU 61 executes the user authentication module ML3, and executes authentication with respect to the management program A (Pa2). Specifically, the CPU 61 searches the user information and determines whether authentication information exists for the management program A (Pa2) in question. In the event that authentication is successful, the CPU 61 runs the execution authority establishing module ML4. If on the other hand authentication is not successful the CPU 61 informs the client computer 30 via the management program A to the effect that authentication failed.

When the CPU 61 executes the execution authority establishing module ML4, on the basis of the user management table, authority to execute assigned to the user are established in the management program A (Pa2). For example, the authority to invoke the management program B (Pb2) via the management program A (Pa2), the authority to modify settings in the management program A (Pa2), or authority settings denying either or both of these are established, The CPU 61 sends the established authority to execute to the request executing module Ma5 of the management program A (Pa2) via the sending/receiving module ML1.

The CPU 11 executes the request executing module Ma5, and depending on the established authority to execute, executes the request input from the client computer 30. In the event that the request input from the client computer 30 invokes the management program B (Pb2), and authority to invoke the management program B (Pb2) via the management program A (Pa2) is verified, the CPU 11 executes the external program invoking module Ma6.

The CPU 11, by means of the request from the client computer 30, identifies the invoked program to be invoked, as described in First embodiment. The CPU 11 invokes the identified invoked program, for example, the management program B (Pb2), and requests the invoked program to send authentication information and program identifying information (program ID) of the management program A (Pa2).

The management program B (Pb2) is run by means of being invoked by the management program A (Pa2). The CPU 11 executes the request receiving module Mb1, and receives the authentication information and process request, and the program ID, sent from the management program A (Pa) (Step S200). The CPU 11 executes the authentication information acquiring module Mb2, acquires the received authentication information, and sends the authentication information for the acquired the management program B (Pb2) to the authentication computer 60.

In the authentication computer 60, the CPU 61 executes the sending/receiving module ML1, and receives identifying information send from the management program B (Pb2). The CPU 61 executes the authentication information acquiring module ML3 and acquires the received authentication information. The CPU 61 executes the user authentication module ML3 and executes authentication with respect to the management program B (Pb2). Specifically, the CPU 61 searches the user information and determines whether authentication information exists for the management program B (Pb2) in question. In the event that user authentication is successful, the CPU 61 runs the execution authority establishing module ML4. On the other hand, in the event that authentication is not successful, the CPU 61 notifies the client computer 30 of the authentication failure via the management program B (Pb2).

When the CPU 61 executes the execution authority establishing module ML4, authority to execute assigned to the user are established, using the program ID. In this embodiment, as in First embodiment, where the program ID of the management program A (Pa2) is received together with authentication information, authority to execute that permit modification of resources in the storage device 20 are established.

On the other hand, when the management program B (Pb2) is run directly from the client computer 30, only authentication information is sent to the authentication computer 60, with no program ID being sent, so there are established authority to execute that allow only reference of resources in the storage device 20. That is, since the program ID is identifying information that is given to the invoked program by the invoking program, it cannot be utilized in cases where the invoked program is run directly.

The CPU 61 sends the established authority to execute to the request executing module Mb5 of the management program B (Pb2) via the sending/receiving module ML1. In the management program B (Pb2) there has been prepared an operation definition table that defines the contents of operating processes that can be executed in association with authority to execute.

The CPU 11 that has received the established authority to execute executes the request executing module Mb5, refers to the operation definition table and determines those operation processes that will be permitted for the established authority to execute, and executes the request input from the client computer 30. In the event that the management program B (Pb2) has been run directly by the client computer 30, even if the request input from the client computer 30 is one to modify a resource in the storage device 20, since only resource reference operation processes are authorized, the request will not be executed. If on the other hand the management program B (Pb2) has been run via the management program A (Pa2), the requested resource modification process will be executed.

As described hereinabove, according to the computer system of Second embodiment, in addition to the advantages afforded by the computer system (administration computer) pertaining to First embodiment, the fact that an authentication computer 60 separate from the administration computer 10 is provided can also reduce the load on the administration computer 10. That is, since authentication processes for the management programs can be executed in the authentication computer 60, there is no need to provided the administration computer 10 with the modules needed for authentication processes, nor is there any need to assign computing resources for executing authentication processes.

Additionally, since user information required for authentication can be managed in consolidated fashion in the authentication computer 60, management and updating of authentication information can be made easier.

Other Embodiments (1) Whereas in Embodiments 1 and 2 there were described examples of interaction of two management programs, authority to execute for the storage device 20 could be used selectively in the same manner where three or more the management programs interact. Such a situation could be accommodated, for example, by providing the user management table shown in FIG. 14. FIG. 14 is an illustration of an exemplary user management table used for establishing authority to execute in the management program B when four management programs interact and execute management of the storage device 20.

In a case where three or more management programs interact, by determining the route by which a program is run, authority to execute can be established depending on the management program executed prior to execution of the management program B. Also, where time information, i.e. order information can be appended to the program ID, authority to execute can be established depending on the order in which management programs are run prior to execution of the management program B. Specifically, where for example the management program B interacts with external program C, and the management program B has acquired a program ID from another program (Program A, for example), order information, after appending a comma to the end of the program ID by the external program invoking module of the management program Pb, order information is generated by linking the program ID of the management program B. The order information generated in this manner is sent to Program C. Management of the program ID acquired by the management program B is stored in memory in a predetermined field in the management program B; the external program invoking module refers to the field, and in the event that a program ID is present, executes the process mentioned above, or if not present, sends only the program ID of the management program B to Program C. In this case, authority to execute can be established with a higher level of detail, depending on the execution environment of the management program.

(2) Whereas in Embodiments 1 and 2 authentication information and program IDs are managed by a single management table, namely, the user management table, authentication information and program IDs could instead managed by several management tables. An example is shown in FIG. 15 and FIG. 16. FIG. 15 is an illustration of an exemplary authentication information management table for managing authentication information. FIG. 16 is an illustration of an exemplary program information management table for administering program information.

The authentication information table shown in FIG. 15 is used to establish authority to execute by means of combinations of user IDs and passwords. The program information management table shown in FIG. 16 is used to define operations executable depending on the route by which a program is run and the authority to execute. For example, in the case of "User" authority to execute, regardless of the route by which a program is run, modification of resources of the storage device 20 will not be permitted, with only reference to resources being permitted.

On the other hand, where "Administrator" authority to execute have been established, in the event that the management program B has been run via the management program A, modification of resources of the storage device 20 will be permitted, whereas if the management program B has been run directly, only reference to resources of the storage device 20 will be permitted. That is, in addition to authority to execute determined on the basis of user ID and password, operations that will ultimately be executable for resources of the storage device 20 are determined with reference to the route by which management program is run.

(3) Whereas in the embodiments hereinabove, the invoking program executing module that executes the invoking program and the invoked [program] executing module that executes the invoked program are realized by means of a single CPU 11, there could instead be provided a number of CPUs, with the invoking program executing module and the invoked program executing module being realized respectively by the CPUs.

(4) Whereas in the embodiments hereinabove, the management program (Pb) comprises cross-check information with the program ID (program running route) of the management program A (the invoking program), it would be possible instead to prepare an interface in the management program A on a per-management program basis, with the management program A providing a program ID (program running route) depending on the interface.

(5) Whereas in Second embodiment, the authentication computer 60 sends authority to execute established with respect to the management program B (Pb2), it would be possible to make notification of whether execution of a request input from the client computer 30 is Allowed or Not Allowed, rather than of authority to execute. This has the advantage that there is no need in the management program B (Pb2) for a table that associates authority to execute with executable operation processes.

(6) Whereas in the embodiments hereinabove, there were described examples in which several management programs are installed on a single administration computer 10, 100, the invention could be implemented analogously in cases where a number of administration computers each having a single management program installed thereon interact, to execute processes requested by client computers.

(7) Whereas in the embodiments hereinabove, there were described examples of an administration computer for a storage device 20 making up a SAN, but implementation would be similar for NAS (Network Attached Storage). In this case, the management processes and access restrictions described above could be executed by routing through a management port for the NAS.

While the computer, access control method in a computer, and computer system which pertain to the invention have been described hereinabove on the basis of embodiments, the embodiments of the invention set forth herein are intended to aid in understanding of the invention, and should not be construed as limiting. Various modifications and improvements to the invention without departing from the spirit and scope thereof as set forth in the appended claims, and these equivalents will of course be encompassed in the invention.

What is claimed is:

1. A user management method for at least one computer coupled to a first managed apparatus, comprising:
   storing an integrated management program;
   storing an apparatus management program for the first managed apparatus;
   storing user management information; and
   receiving user authentication information of a first user, and a management request for the first managed apparatus for at least the apparatus management program;
   wherein the user management information indicates a first authority and a second authority for the first user, the first authority is an authority that the first user manages the first managed apparatus by using the apparatus management program without the integrated management program, the second authority is an authority that the first user manages the first managed apparatus by using the apparatus management program through the integrated management program;
   wherein if the user authentication information and the management request are for the apparatus management program:
      the apparatus management program decides whether the first user has an authority to execute the management request based on the first authority of the user management information and the user authentication information, and
      the apparatus management program sends the management request to the first managed apparatus if the first authority includes permission to execute the management request;
   wherein if the user authentication information and the management request are for the integrated management program:
      the integrated management program decides whether the first user has an authority to execute the management request based on the user authentication information and based on the user management information or another user management information for the integrated management program,
      the integrated management program internally or externally sends a management request to the apparatus managed program with the user authentication information if the first user is permitted to execute the management request for the integrated management program,
      the apparatus management program decides whether the first user has an authority to execute the management request based on the second authority of the user management information and the user authentication information, and the apparatus management program sends the management request to the first managed apparatus if the second authority includes permission to execute the management request; and wherein the first authority and the second authority are different.

2. A user management method according to claim 1, wherein the first authority includes permission to refer to a first resource of the first managed apparatus, and the second authority includes permissions to refer and create the first resource of the first managed apparatus.

3. A user management method according to claim 1, wherein the user authentication information includes an identification of the user.

4. A user management method according to claim 2, wherein the first managed apparatus is a storage apparatus, and the resource is a volume of the storage apparatus.

5. A user management method according to claim 1, further including:

receiving user authentication information of a first user, and a management request for a second managed apparatus for at least the apparatus management program;

wherein if the user authentication information and the management request are for the apparatus management program, then the apparatus management program sends the management request to the second managed apparatus if the first authority includes permission to execute the management request, and if the user authentication information and the management request are for the integrated management program, then the apparatus management program sends the management request to the second managed apparatus if the second authority includes permission to execute the management request.

6. A user management method at a management computer coupled to a first managed apparatus over a computer network, the method comprising:

receiving a management request and user authentication information at the management computer from a client computer for utilization of the first managed apparatus through at least one of an apparatus management program at the management computer or an integrated management program stored at the management computer;

determining a first authority and a second authority for a first user at the client computer, based on user management information stored at the management computer, wherein the first authority is an authority through which the first user manages the first managed apparatus by using the apparatus management program without the integrated management program, and the second authority is an authority through which the first user manages the first managed apparatus by using the apparatus management program through the integrated management program;

wherein if the user authentication information and the management request are for utilization of the first managed apparatus through the apparatus management program, then:

the apparatus management program decides whether the first user has an authority to execute the management request based on the first authority of the user management information and the user authentication information, and the apparatus management program sends the management request to the first managed apparatus if the first authority includes permission to execute the management request;

wherein if the user authentication information and the management request are for utilization of the first managed apparatus through the integrated management program, then the integrated management program:

the integrated management program decides whether the first user has an authority to execute the management request based on the user authentication information and based on the user management information or another user management information for the integrated management program, the integrated management program internally or externally sends a management request to the apparatus managed program with the user authentication information if the first user permitted to execute the management request for the integrated management program, the apparatus management program decides whether the first user has an authority to execute the management request based on the second authority of the user management information and the user authentication information, and the apparatus management program sends the management request to the first managed apparatus if the second authority includes permission to execute the management request; and wherein the first authority and the second authority are different.

7. A user management method according to claim 6, further including:

receiving a management request and user authentication information at the management computer from the client computer for utilization of a second managed apparatus through at least one of an apparatus management program at the management computer or an integrated management program stored at the management computer;

wherein if the user authentication information and the management request are for the apparatus management program, then the apparatus management program sends the management request to the second managed apparatus if the first authority includes permission to execute the management request, and if the user authentication information and the management request are for the integrated management program, then the apparatus management program sends the management request to the second managed apparatus if the second authority includes permission to execute the management request.

* * * * *